United States Patent

Ma

[11] Patent Number: 5,507,708
[45] Date of Patent: Apr. 16, 1996

[54] STAIR CLIMBING EXERCISE DEVICE CAPABLE OF PLAYING WITH A VIDEO GAME MACHINE

[76] Inventor: Ming H. Ma, P.O. Box 82-144, Taipei, Taiwan

[21] Appl. No.: 260,957

[22] Filed: Jun. 16, 1994

[51] Int. Cl.⁶ .......................... A63B 21/005; A63B 23/00
[52] U.S. Cl. .................. 482/52; 482/902; 482/74
[58] Field of Search ............... 482/52, 74, 902, 482/146, 147, 1–9; 434/112

[56] References Cited

U.S. PATENT DOCUMENTS

| | | | |
|---|---|---|---|
| D. 157,436 | 12/1950 | Rogers | 482/52 |
| 5,049,079 | 9/1991 | Furtado et al. | 482/902 |
| 5,076,584 | 12/1991 | Openiano | 482/902 |
| 5,260,869 | 11/1993 | Ferrier et al. | 434/112 |
| 5,308,296 | 5/1994 | Eckstein | 482/902 |

FOREIGN PATENT DOCUMENTS 1576361  10/1980  United Kingdom ............ 482/74

*Primary Examiner*—Stephen R. Crow
*Attorney, Agent, or Firm*—Alfred Lei

[57] ABSTRACT

A stair climbing exercise apparatus capable of playing with a video game machine including a body portion having a plurality of steps each of which is formed with a plurality of recesses, each of the recesses having a plurality of cavities, a pedal fitted in each of the recesses and having a plurality of protuberances adapted to be received in the cavities, a spring disposed within each of the cavities, and a microswitch arranged in each of the recesses and under the pedal.

1 Claim, 4 Drawing Sheets

STAIR CLIMBING EXERCISE DEVICE CAPABLE OF PLAYING WITH A VIDEO GAME MACHINE

BACKGROUND OF THE INVENTION

Heretofore, various types of exercisers and exercise machines have been known for strengthening and improving various parts of a human body. In many cases, the exercise programs for stimulating the heart rate and breathing rate in order to increase sense of well-being and decrease likelihood of disease of the circulatory system.

Generally, the use of known types of aerobic exercisers has involved a considerable degree of monotony. The exercise is tedious and more than a little self-discipline is required to maintain a regimen of regular workouts.

Therefore, it is an object of the present invention to provide a stair climbing exercise apparatus which is capable of playing with a video game thereby providing the user with much fun in exercise.

SUMMARY OF THE INVENTION

This invention is concerned with a stair climbing exercise device capable of playing with a video game.

It is the primary object of the present invention to provide a stair climbing exercise device which enables the user to play a video game at the same time when he is taking exercise.

It is another object of the present invention to provide a stair climbing exercise device which is interesting in use.

It is still another object of the present invention to provide a stair climbing exercise device which is simple in construction.

It is still another object of the present invention to provide a stair climbing exercise device which is low in cost.

It is a further object of the present invention to provide a stair climbing exercise device which is fit for practical use.

The other objects and merits and a fuller understanding of the present invention will be obtained by those having ordinary skill in the art when the following detailed description is read in conjunction with the accompanying drawings wherein like numerals refer to like or similar part.

DETAILED DESCRIPTION OF THE PREFERRED EMBODIMENT

Figure 1:
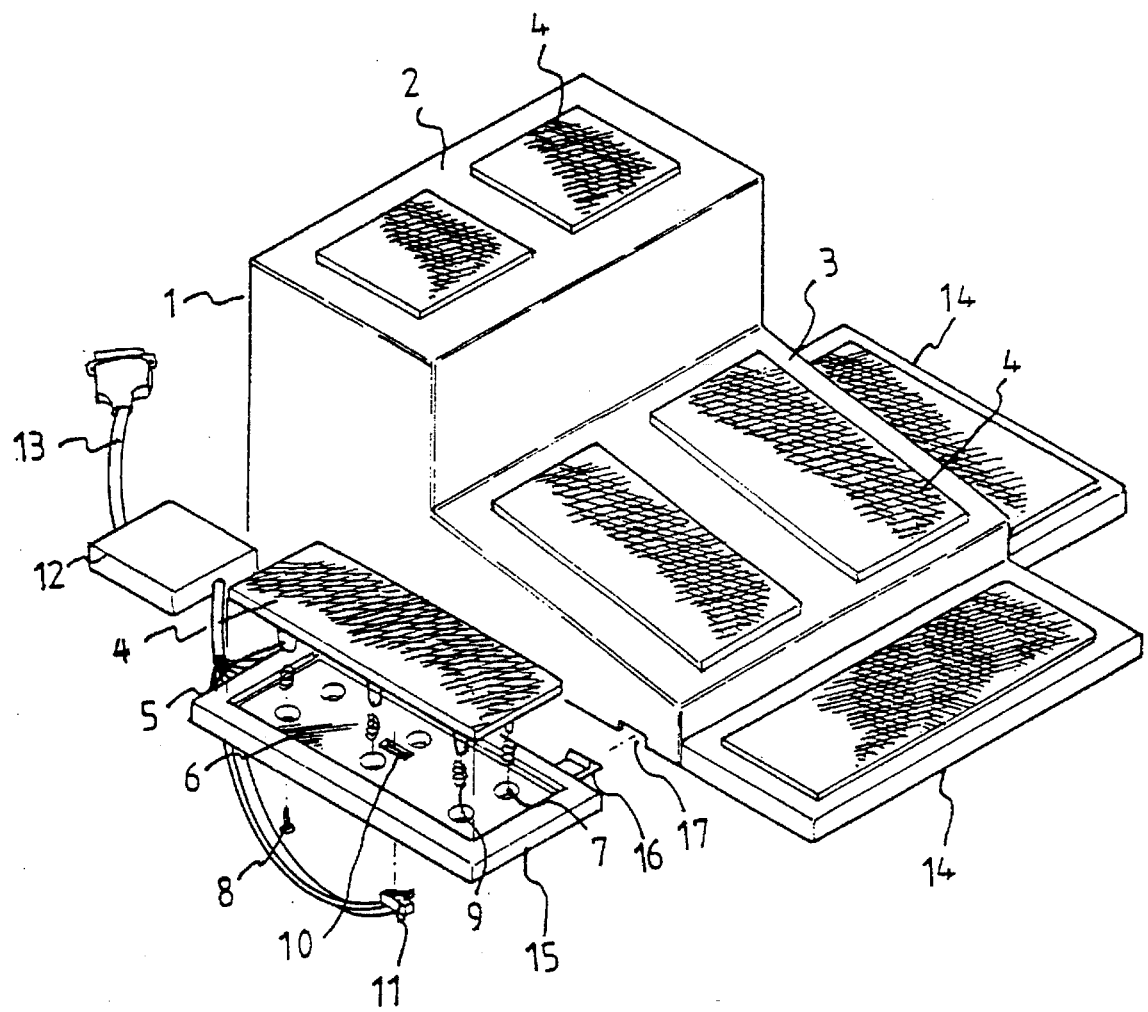
FIG. 1 is an exploded view of the present invention.

For the purpose of promoting an understanding of the principles of the invention, reference will now be made to embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
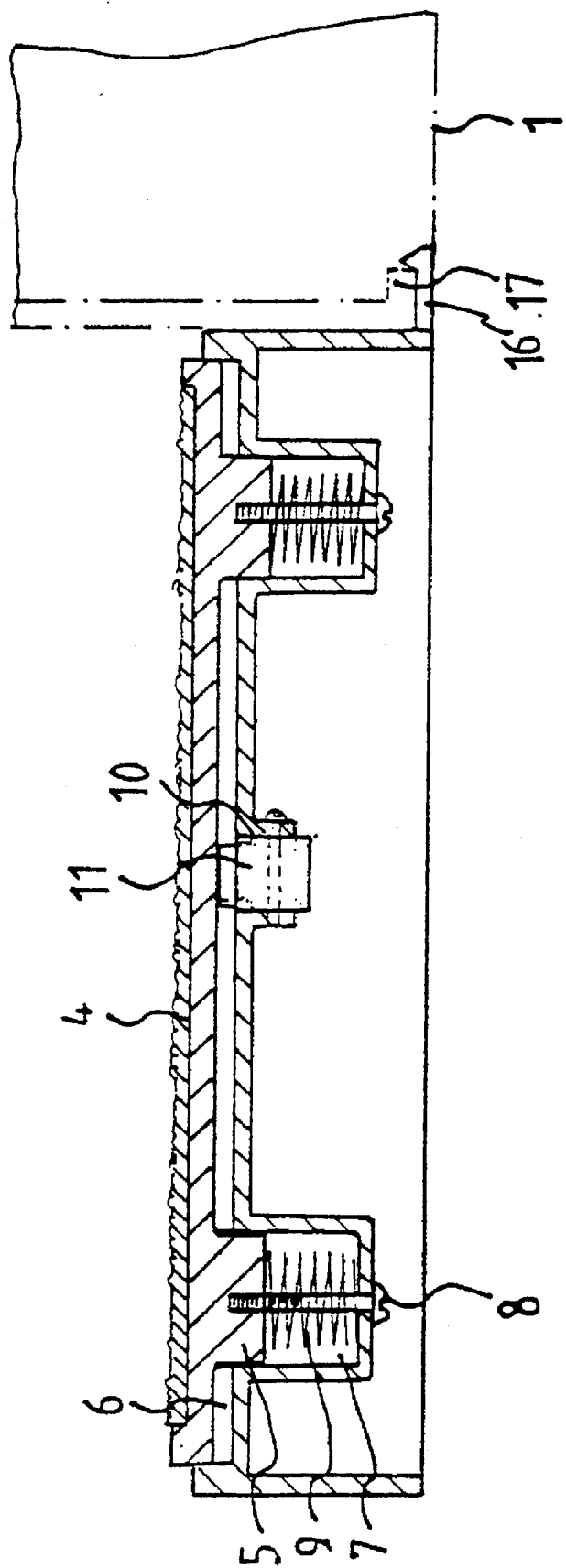
FIG. 2 is a sectional view of the present invention.
Figure 3:
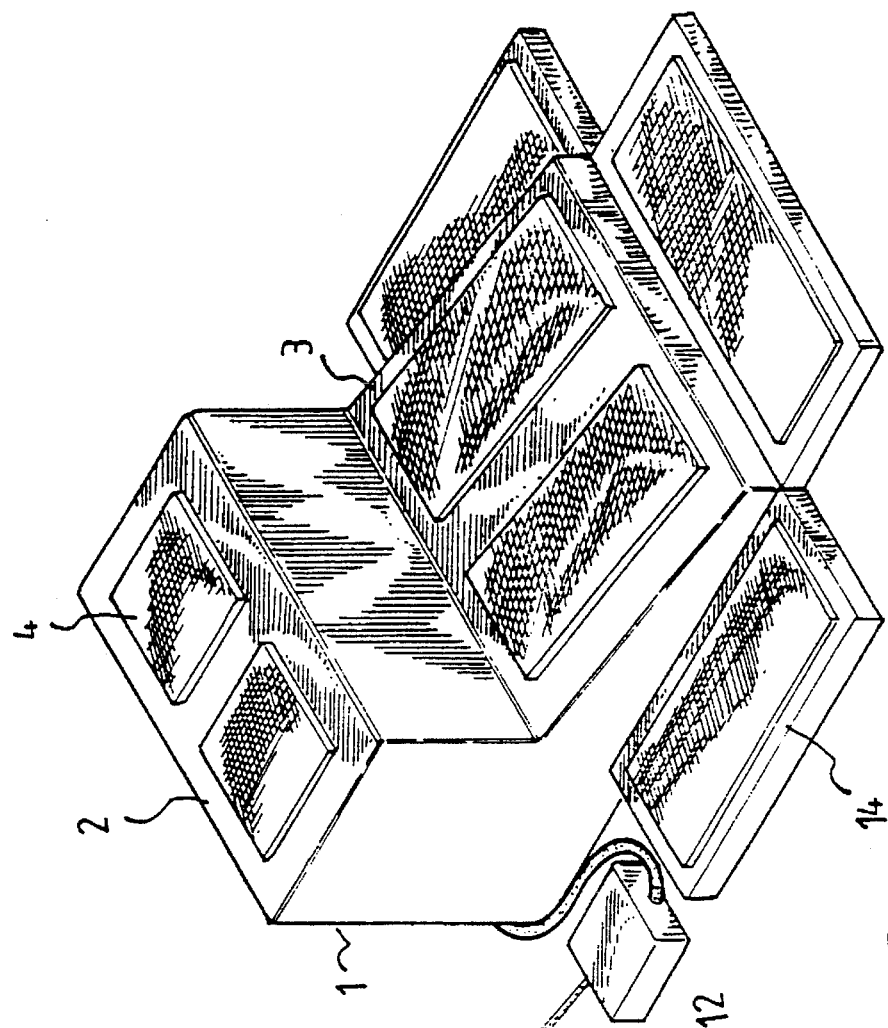
FIG. 3 is a working view of the present invention.

With reference to the drawings and in particular to FIGS. 1 and 2 thereof, the stair climbing exercise apparatus capable of playing with a video game comprises a body portion 1 with an upper step 2 and a lower step 3 each of which is formed with two recesses 6. The recess 6 has a plurality of cavities 7. In each recess 6 of the upper step 2 and the lower step 3 is fitted a pedal 4. The pedal 4 is formed at the bottom with a plurality of protuberances 5 adapted to be received in the cavities 7. A spring 9 is disposed within the cavity 7. A bolt 8 is inserted into the cavity 7 from the bottom, extending through the spring 9 to engage the protuberance 5. In addition, the recess 6 is formed at the center with a hole 10 in which is fitted a micro-switch 11 so that when the pedal 4 is pressed downward, the micro-switch 11 will be triggered once thereby sending a signal to a coder 12 (see FIG. 4). As shown in FIG. 3, the coder 12 is connected to a joystick interface (not shown) in a computer or a video game machine (not shown).

Referring in FIG. 2, additional pedals 14 are mounted around the body portion 1. The additional pedal 14 is fitted in a tray 15 having a plurality of cavities 7, with its protuberances 5 engaged with the cavities 7. A spring 9 is disposed under the protuberance 5 of the pedal 14 within the cavity 7 of the tray 15. A bolt 8 is inserted into the cavity 7 form the bottom, extending through the spring 9 to engage the protuberance 5. A micro-switch 11 is arranged in a hole 10 of the tray 15 so as to send a signal to the coder when triggered once. In addition, the tray 15 is provided with male connectors 16 engageable with the notches 17 of the body portion 1.

Figure 4:
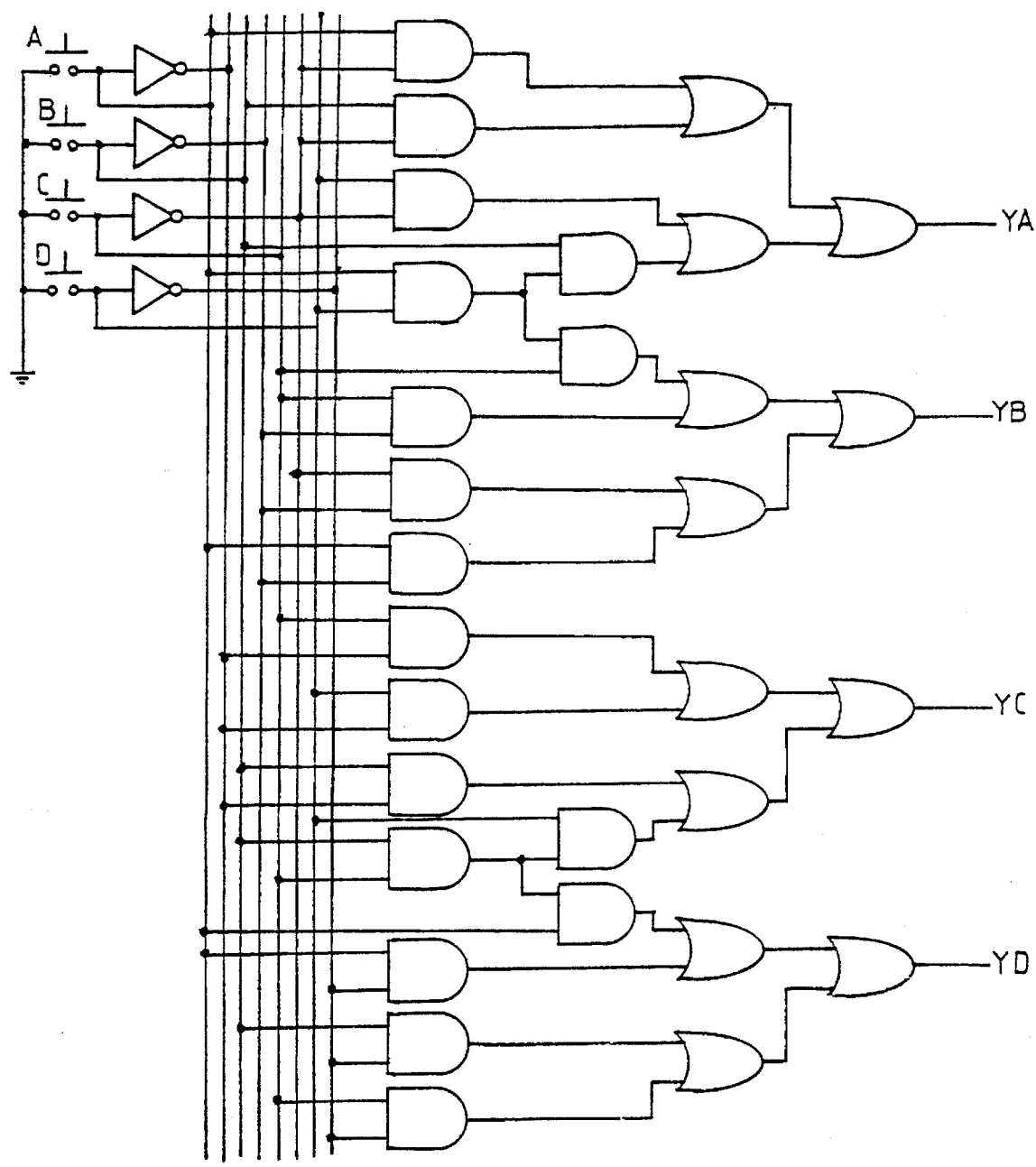
FIG. 4 shows a logic circuit diagram of the coder according to the present invention.

As can be seen in FIG. 4, by means of different combinations of the key buttons A, B, C and D, there will be 16 different instructions. Further, YA, YB, YC and YD are connected to the output of the video game machine or computer.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A stair climbing exercise apparatus capable of playing with a video game machine comprising:

a body portion including an upper step and a lower step each of which is formed with two recesses each having a plurality of cavities;

a first tray connected with a front side of said lower step and having a recess formed with a plurality of cavities;

a second tray connected with a left side of said lower step and having a recess formed with a plurality of cavities;

a third tray connected with a right side of said lower step and having a recess formed with a plurality of cavities;

seven pedals each fitted in a corresponding one of said recesses and having a plurality of protuberances adapted to be received in said cavities;

a plurality of springs each disposed within each of said cavities; and a plurality of micro-switches for controlling a video game machine, each arranged in each of said recesses and under a corresponding one of said pedals.

* * * * *